(12) United States Patent
He et al.

(10) Patent No.: US 11,783,179 B2
(45) Date of Patent: Oct. 10, 2023

(54) SYSTEM AND METHOD FOR DOMAIN- AND LANGUAGE-INDEPENDENT DEFINITION EXTRACTION USING DEEP NEURAL NETWORKS

(71) Applicants: Robert Bosch GmbH, Stuttgart (DE); Lin Zhao, Sunnyvale, CA (US); Kui Xu, Sunnyvale, CA (US); Zhe Feng, Mountain View, CA (US)

(72) Inventors: Yifan He, Sunnyvale, CA (US); Lin Zhao, Sunnyvale, CA (US); Kui Xu, Sunnyvale, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 16/958,892

(22) PCT Filed: Dec. 27, 2018

(86) PCT No.: PCT/US2018/067626
§ 371 (c)(1),
(2) Date: Jun. 29, 2020

(87) PCT Pub. No.: WO2019/133676
PCT Pub. Date: Jul. 4, 2019

(65) Prior Publication Data
US 2020/0342168 A1 Oct. 29, 2020

Related U.S. Application Data

(60) Provisional application No. 62/611,577, filed on Dec. 29, 2017.

(51) Int. Cl.
*G06F 17/00* (2019.01)
*G06N 3/08* (2023.01)
(Continued)

(52) U.S. Cl.
CPC ............. *G06N 3/08* (2013.01); *G06F 16/367* (2019.01); *G06F 40/237* (2020.01); *G06N 3/042* (2023.01);
(Continued)

(58) Field of Classification Search
CPC ............ G06N 3/08; G06N 5/04; G06N 5/042; G06N 5/045; G06N 5/043; G06N 5/046;
(Continued)

(56) References Cited

U.S. PATENT DOCUMENTS 10,909,329 B2 * 2/2021 Gao ..................... G06N 3/0445
2007/0027863 A1 2/2007 Powell et al.
(Continued)

FOREIGN PATENT DOCUMENTS

CA 2 370 032 A1 10/2000
CA 2510761 A1 * 12/2005 ........... G06F 16/367
(Continued)

OTHER PUBLICATIONS

Xu, Jiaming, et al. "Short text clustering via convolutional neural networks." Proceedings of the 1st Workshop on Vector Space Modeling for Natural Language Processing. 2015. (Year: 2015).*
(Continued)

*Primary Examiner* — Michael Ortiz-Sanchez
(74) *Attorney, Agent, or Firm* — Maginot, Moore & Beck LLP

(57) ABSTRACT

A method of automatically generating a terminology definition knowledge base (KB) includes mapping each word in a word sequence to a real value dense vector using dense vector representations. The word sequence is then processed using a Convolutional Neural Network (CNN) model to identify whether the word sequence includes a terminology definition and to label the word sequence with a label indicating whether a terminology definition exists within the (Continued)

word sequence. The word sequence is then processed using a Conditional Random Field (CRF) model to identify boundaries of the terminology definition in the word sequence. The terminology definition is then extracted and added to the terminology definition KB.

12 Claims, 3 Drawing Sheets

(51) Int. Cl.

| | | |
|---|---|---|
| *G06F 40/237* | (2020.01) | |
| *G06N 3/042* | (2023.01) | |
| *G06N 3/044* | (2023.01) | |
| *G06N 3/045* | (2023.01) | |
| *G06F 16/36* | (2019.01) | |
| *G06F 40/247* | (2020.01) | |
| *G06F 40/279* | (2020.01) | |

(52) U.S. Cl.
CPC .............. *G06N 3/044* (2023.01); *G06N 3/045* (2023.01); *G06F 40/247* (2020.01); *G06F 40/279* (2020.01)

(58) Field of Classification Search
CPC .......... G06N 5/047; G06N 5/048; G06N 3/02; G06N 5/02; G06N 3/042; G06N 3/0464; G06N 5/022; G06F 40/237; G06F 40/20; G06F 40/00; G06F 40/10; G06F 40/242; G06F 16/3347; G06F 40/284; G06F 18/24; G06F 16/285; G06F 16/35; G06F 16/5846; G06F 18/23; G06F 18/41; G06F 2218/12; G06F 40/289; G06F 16/367; G06F 40/247; G06F 40/279
See application file for complete search history.

(56) References Cited

U.S. PATENT DOCUMENTS

| | | |
|---|---|---|
| 2014/0236577 A1 | 8/2014 | Malon et al. |
| 2017/0286401 A1 | 10/2017 | He et al. |

FOREIGN PATENT DOCUMENTS

| | | | |
|---|---|---|---|
| CN | 107122416 A | 9/2017 | |
| WO | 00/49536 A1 | 8/2000 | |
| WO | WO-2018085730 A1 * | 5/2018 | ........... B27B 29/085 |

OTHER PUBLICATIONS

Liu, Xiaodong, et al. "Representation learning using multi-task deep neural networks for semantic classification and information retrieval." (2015). (Year: 2015).*
International Search Report corresponding to PCT Application No. PCT/US2018/067626, dated Apr. 12, 2019 (3 pages).
Li, M. et al., "Joint RNN Model for Argument Component Boundary Detection," IEEE SMC 2017, Computation and Lanuguage, arXiv:1705.02131v1, May 5, 2017 (6 pages).
Yuan, S. et al., "Task-specific Word Identification from Short Texts Using a Convolutional Neural Network," International Journal, Computation and Language, arXiv:1706.00884v1, Jun. 3, 2017 (24 pages).
Arras, L. et al., "What is relevant in a text document?: An interpretable machine learning approach," PLoS ONE, 12(8): e0181142, Aug. 11, 2017, available at https://doi.org/10.1371/journal.pone.0181142 (23 pages).
Jin, Y. et al., "Mining Scientific Terms and their Definitions: A Study of the ACL Anthology," Proceedings of the 2013 Conference on Empirical Methods in Natural Language Processing, Oct. 18-21, 2013, pp. 780-790 (11 pages).

* cited by examiner

SYSTEM AND METHOD FOR DOMAIN- AND LANGUAGE-INDEPENDENT DEFINITION EXTRACTION USING DEEP NEURAL NETWORKS

CROSS-REFERENCE TO RELATED APPLICATIONS

This application is a 35 U.S.C. § 371 National Stage Application of PCT/US2018/067626, filed on Dec. 27, 2018, which claims priority to U.S. Provisional Application Serial No. 62/611,577, filed on Dec. 29, 2017, the disclosures of which are incorporated herein by reference in their entirety.

TECHNICAL FIELD

This invention relates to the field of natural language processing (NLP), information extraction, terminology processing, and human machine interaction (HMI).

BACKGROUND

Knowledge bases (KBs) are among the most important pillars of modern intelligent systems. KBs are both provided as standalone products or services, and enable downstream applications such as question answering and semantic search: e.g. to answer questions about "direct injection" by automobile professionals, many systems rely on pre-constructed knowledge bases about automobile terminologies.

One of the major hurdles the KB-based applications facing is the sheer cost associated to manual KB construction, especially domain-specific KB construction that requires large amount of tedious work by domain experts.

Automatic KB construction is attracting a lot of interest because of the potential to significantly reduce this cost. However, most automatic KB construction still relies on complex machine learning algorithms and carefully curated features, and it still requires considerable effort to design these algorithms and features and to adapt the algorithms and features to different languages which would multiply the required effort.

SUMMARY

A system is proposed for extracting terminology definitions from free text that does not require feature design and is independent to both domain and language. It leverages unsupervised word vectors to capture semantic information in words and CNN and CRF models to detect the existence and boundary of definitions respectively, resulting in a definition extraction system that requires little human intervention.

DETAILED DESCRIPTION

Figure 1:
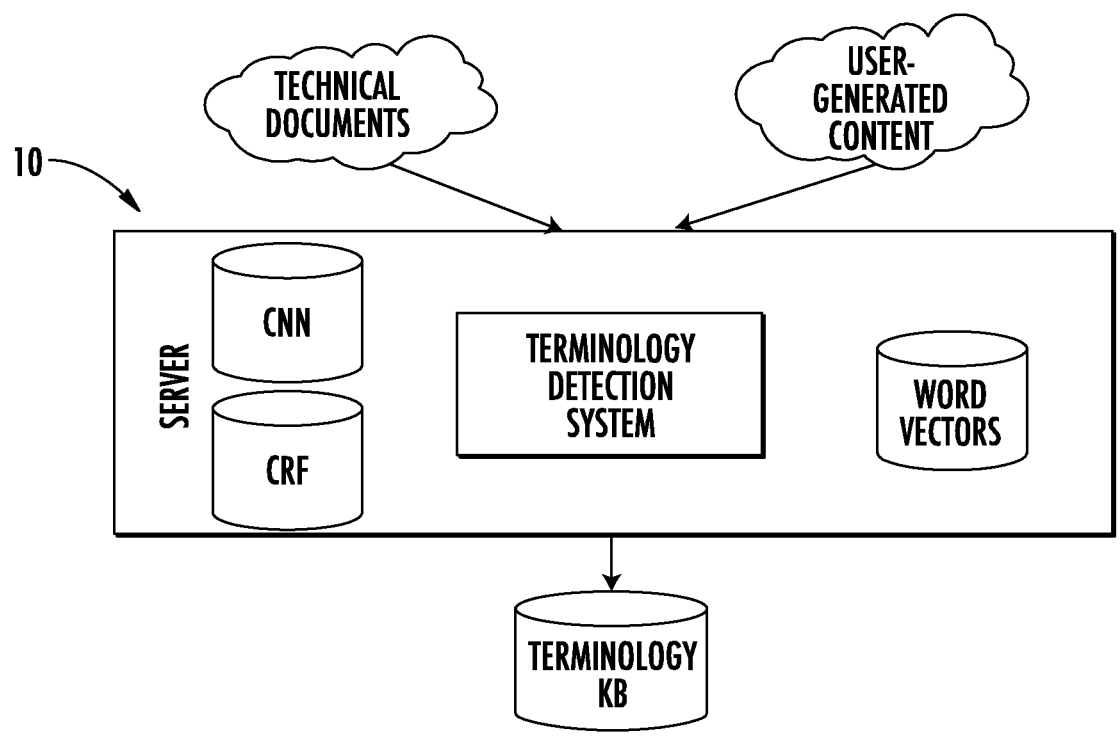
FIG. 1 is a schematic depiction of a high-level architecture of a system for automatically constructing terminology definition knowledge bases (KBs) according to the present disclosure.
Figure 2:
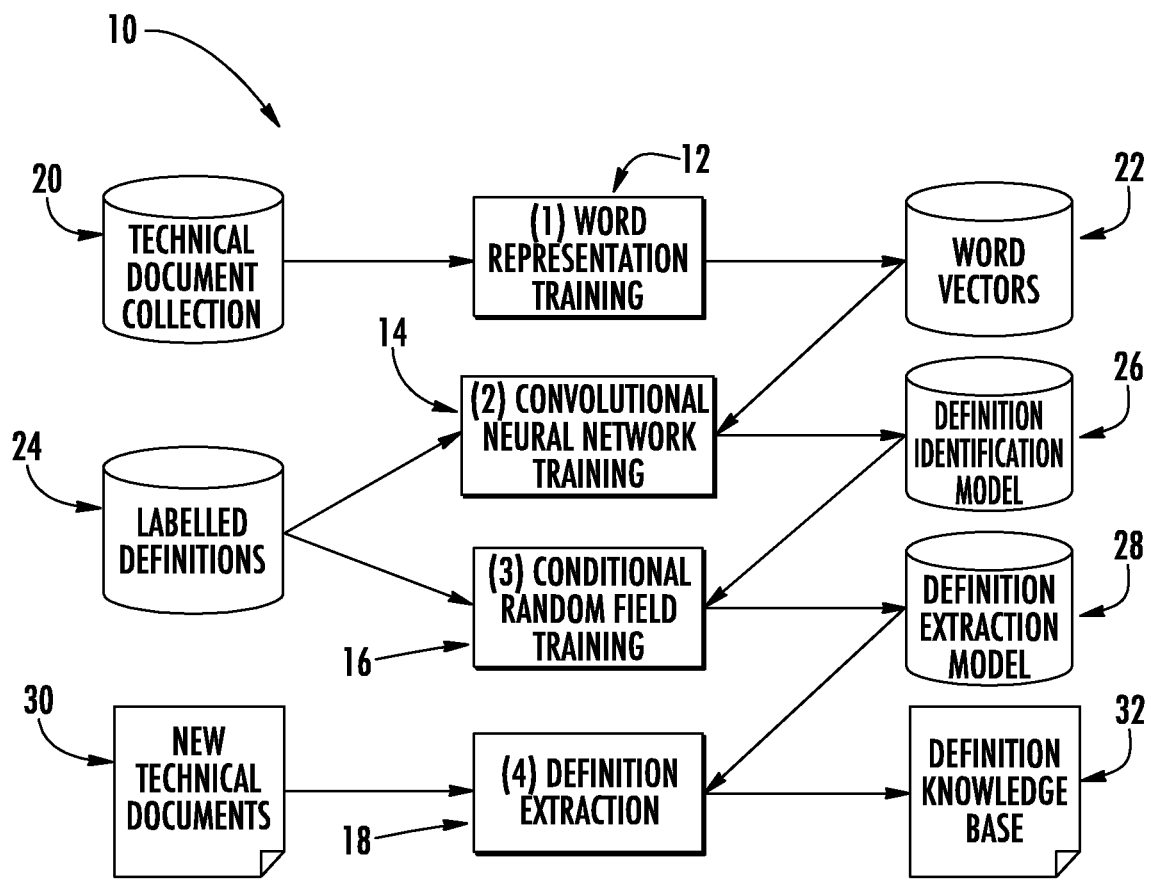
FIG. 2 is a workflow diagram of a domain-independent terminology linking system in accordance with this disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

This disclosure is directed to a system and method for automatically constructing terminology definition KBs that requires minimal effort in feature design and is easily adapted to multiple languages. A high-level schematic view of the architecture of such a system is depicted in FIG. 1. The system receives text media, such as technical documents and user-generated content, as input. Technical documents include academic papers, technical reports, specifications, manuals, and the like, while user-generated content refers to text content that has been generated by users and posted to an online platform, such as social media, wikis, forums, and the like. The system outputs a terminology KB with definitions of terminology from the text media. The terminology KB can take any suitable form.

The system includes a definition extraction system which is configured to use a word vector model, a Convolutional Neural Network (CNN) model and a Conditional Random Field (CRF) model to identify and extract terminology definitions from the text media and use the extracted definitions to construct a terminology definition KB. The definition extraction system may be implemented online as a server that provides terminology definition extraction and knowledge base generation as a service.

The word vector model, CNN model and CRF model are used as a cascaded pipeline. The definition extraction system processes the text media on a sentence-by-sentence basis by passing each input sentence through the pre-trained models one-by-one. The word vector model is used to map the words in the sentence to dense vector representations. The CNN model is used to identify whether the sentence includes a definition. The CRF model is then used to detect the boundaries of the definition within the sentence. The definitions may then be extracted and used to populate a terminology definition KB.

As alluded to above, a central concept of the scheme is to extract terminology definitions from text in three stages, with each stage focusing on automatically capturing one type of information.

In the first stage, a dense vector representation is trained that encodes the semantic information in the vocabulary. The representation maps each word in the vocabulary to a real-value dense vector. The words that share similar meanings are mapped to vectors that are close according to cosine similarity in the Euclidean space. This step makes our model generalizable: without specifically designed rules, the system can capture that "define" is closer to "call" than to a random verb, such as "go", and that if "we define A as B" is a definition, it is also possible that "we call A as B" is also a definition in scientific literature.

The second stage captures signals that suggest the existence of a terminology definition using a Convolutional Neural Networks (CNN). Human annotators are tasked to assign a binary (True|False) label to a small sample (2,000) of sentences from scientific documents. Using the human annotated sentences and vector representations from the previous stage, a CNN model is trained to automatically assign this truth value to new sentences. After this stage, the system is able to detect that "we define A as B" is a definition, and "A is based on B" is not a definition.

The third stage detects definition boundaries by synthesizing the information obtained from previous stages: the vector representations from stage 1 and the truth value from stage 2 are used as features to train a Conditional Random Field (CRF) model to detect the boundaries of definitions. In the sentence "we define A as B", the system would extract "A" as the terminology and "B" as the definition as the definition for the terminology. The extracted terminology and definition can then be stored in a KB. None of these stages requires engineering of linguistic features, so the whole pipeline can be applied to any language.

There are several main novelties and advantages in this system. For example, the system utilizes unsupervised word embedding (i.e. dense word representation vectors) as the input to the classifiers. As another example, the system uses two different classification models for definition extraction, with one model focusing on identifying whether a definition exists within a sentence, and one model focusing on identifying the boundaries of the definition within the sentence.

One of the main advantages of the cascaded pipeline approach and the use of dense vector representations is that feature engineering is not needed. In addition, the scheme does not make any assumptions regarding the language or the domain of the text media. As a result, the system is independent of both domain and language. These factors significantly reduce the cost of knowledge base construction.

A workflow diagram of an automatic terminology definition KB construction system 10 is depicted in FIG. 1. This system 10 comprises four major components. These components are a word representation training component 12, a Convolutional Neural Network (CNN) training component 14, a Conditional Random Field (CRF) training component 16, and a definition extraction component 18. The word representation training component 12, the Convolutional Neural Network (CNN) training component 14, and the Conditional Random Field (CRF) training component 16 are offline components to train models. The definition extraction component 18 is an online component that is able to extract definition entries from free text on-the-fly.

The word representation training component 12 takes a text document collection 20 as input and produces real value vectors 22 that are mapped to each word. The real value vectors correspond to dense vector representations of the words, or word embeddings. The vectors represent projections of the words into a vector space. The position of the word in the vector space is referred to as its embedding. In one embodiment, a skip-gram recursive neural network (RNN) is used to obtain the dense vector representations. In other embodiments, any suitable method or algorithm may be used.

The CNN training component 14 receives the trained word vectors 22 and labeled definitions 24. The labeled definitions comprise a small set of sentences annotated with a binary label that indicates whether the sentence is a terminology definition or not. The output of the CNN component 14 is a definition identification model 26 that takes unseen sentences as input and predicts whether sentence contains a definition.

Figure 3:
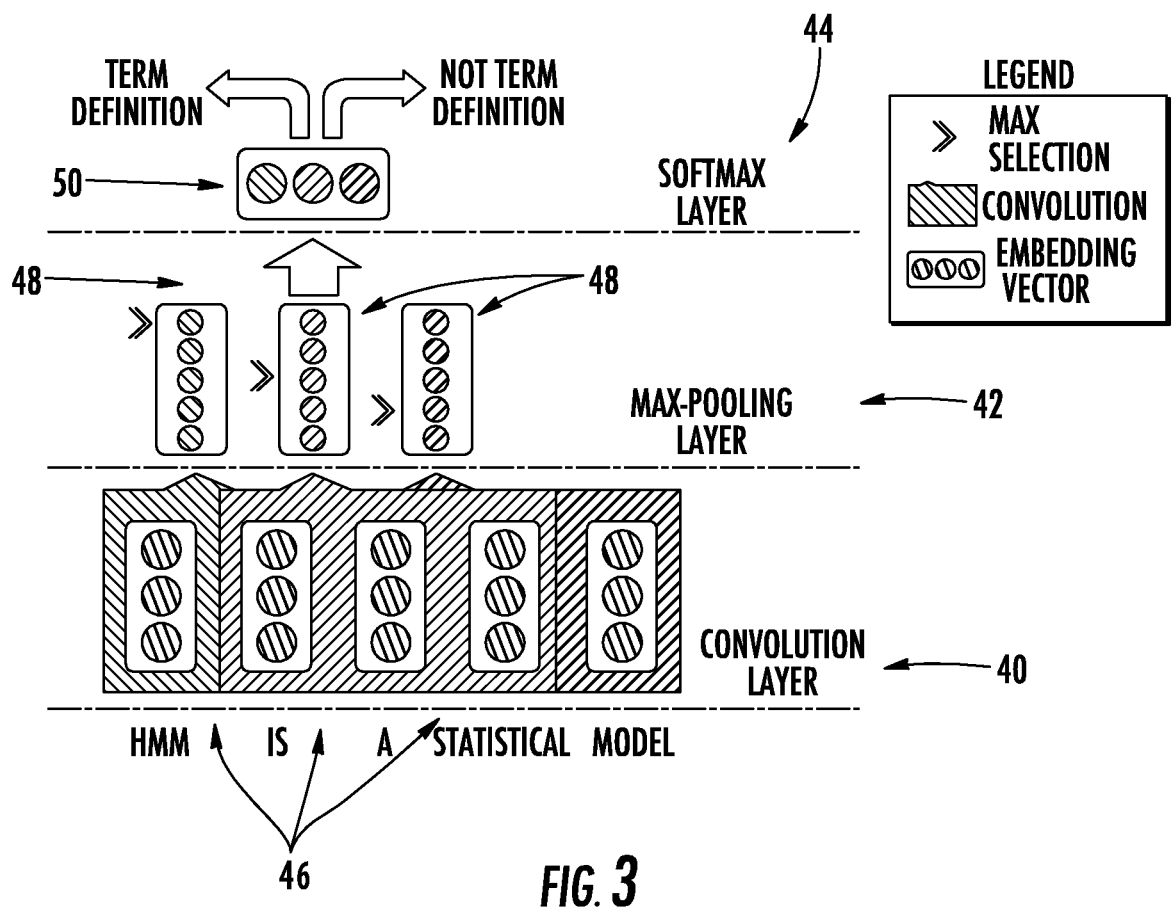
FIG. 3 depicts a CNN Architecture for Definition Identification.

The architecture of the CNN definition identification model 26 is illustrated in FIG. 3. The CNN definition identification model includes a convolution layer 40, a max-pooling layer 42, and a softmax output layer 44. Given an input sentence, the CNN first searches a pre-trained word embedding to find vector representations to each word. In the convolution layer 40, the CNN slides through the input vectors in several passes and performs convolution on fixed-size windows 46 to distil information from multi-word constructions. The convolution vectors 48 are then processed by the Max-pooling layer 42, which extracts the largest dimension from each convolution vector to form a condense representation 50 of the input sentence. The Soft-Max layer 44 finally predicts if the sentence contains a terminology definition based on the condense vector 50.

The CRF training component 16 takes a small set of sentences annotated with definition boundaries as input, and utilizes the binary truth label predicted by the CNN training component 14 as well as lexical forms in a window of 3 as features to train a CRF definition extraction model to detect definition boundaries in a sentence. In one embodiment, CRF definition extraction model is configured to tag the words in a sentence to indicate the boundaries of the definition. As one example, the output of the CRF model may be a sequence of B/I/O tags, with each tag corresponding to a word. The "B" tag indicates the start of a definition; the "I" tag indicates other words in the definition; the "O" tag indicates that the word is not part of a definition. Any other suitable tagging/labeling scheme may be utilized to identify the boundaries of the definition.

The definition extraction component 18 is the only online component in the proposed system. The definition extraction component 18 preloads the dense word vector model 22, the CNN definition identification model 26, and the CRF definition extraction model 28 produced by the training components. The definition extraction component uses these models to identify and extract definitions from new technical documents 30. The models form a cascaded pipeline for processing sentences from the new documents. As noted above, the word vector model is used to map the words in the sentence to dense vector representations. The CNN model is used to identify whether the sentence includes a definition. The CRF model is then used to detect the boundaries of the definition within the sentence. The terminologies and their corresponding definitions may then be extracted and used to populate a terminology definition KB.

The system for automatically constructing terminology definition KBs is implemented using at least one computing device. In particular, the functionality of the system may be implemented in a single device or distributed across multiple computing devices. A computing device for the system may be a desktop computer, laptop or other type of device that includes at least one processor, memory, a user interface, and a network communications system.

The processor 21 may be any of various processors as will be recognized by those of ordinary skill in the art. It will be recognized by those of ordinary skill in the art that a "processor" as used herein includes any hardware system, hardware mechanism or hardware component that processes data, signals, and/or other information. The processor can include a system with a central processing unit, multiple processing units, dedicated circuitry for achieving functionality, and/or other systems. Exemplary processors include microprocessors (pP), microcontrollers (pC), digital signal processors (DSP), graphics processing unit (GPU), or any combination thereof. The processor is operably connected to the memory, a user interface, and a network communications module.

The memory of the computing device is configured to store information, including both data and instructions. The memory may be of any type of device capable of storing information accessible by the processor, such as a memory card, ROM, RAM, write-capable memories, read-only memories, hard drives, discs, flash memory, or any of various other computer-readable medium serving as data storage devices as will be recognized by those of ordinary skill in the art. The memory is configured to store program instructions that, when executed by the processor, enable the server 20 to provide the features, functionality, characteristics and/or the like as described herein.

The network communications system of the computing device provides an interface that allows for communication with any of various devices or networks and at least includes transceivers or other hardware configured to communicate with the computing device. In particular, the network communications module may include a local area network port that allows for communication with any of various local computers housed in the same or nearby facility. In some embodiments, the network communications module further includes a wide area network port that allows for communications with remote computers over the Internet. Alternatively, the server communicates with the Internet via a separate modem and/or router of the local area network. In one embodiment, the network communications module is equipped with a Wi-Fi transceiver or other wireless communications device. Accordingly, it will be appreciated that communications with the server may occur via wired communications or via the wireless communications. Communications may be accomplished using any of various known communications protocols.

The computing device for the system may be configured as a server. A server may be operated locally or remotely by a user. To facilitate local operation, the server may include an interactive user interface. Via the user interface, a user may modify and/or update program instructions stored on the memory, as well as collect data from and store data to the memory. In one embodiment, the user interface may suitably include an LCD display screen or the like, a mouse or other pointing device, a keyboard or other keypad, speakers, and a microphone, as will be recognized by those of ordinary skill in the art. Alternatively, in some embodiments, a user may operate the server remotely from another computing device which is in communication therewith via the network communications module and has an analogous user interface.

The computing device includes programmed instructions which may be stored in the memory for implementing the various functionalities of the system. In particular, the programmed instructions may include instructions for implementing the word representation training component, the CNN training component and/or the CNN definition identification model, the CRF training component and/or the CRF definition extraction model, and the definition extraction component.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of automatically generating a terminology definition knowledge base (KB) from text media, the method comprising:
   receiving a word sequence to use in constructing the terminology definition KB;
   mapping each word in the word sequence to a real value dense vector using dense vector representations;
   processing the word sequence based on the dense vector representations of the words using a Convolutional Neural Network (CNN) definition identification model to identify whether the word sequence includes a terminology definition and to label the word sequence with a binary label indicating whether a terminology definition exists within the word sequence;
   processing the word sequence based on the dense vector representations of the words and the binary label using a Conditional Random Field (CRF) definition extraction model to identify boundaries of the terminology definition in the word sequence;
   adding the terminology definition to the terminology definition KB.

2. The method of claim 1, wherein the dense vector representations are generated by a word representation training component that receives a text collection as input and uses a skip-gram recursive neural network (RNN) to process the text collection to generate the dense vector representations.

3. The method of claim 1, wherein the CNN definition identification model is generated by a CNN training component, the CNN training component using the dense vector representation and a plurality of training word sequences to train the CNN definition identification model to automatically identify whether a word sequence includes a terminology definition and to assign an appropriate binary label to the word sequence.

4. The method of claim 3, wherein the binary label assigned to the respective training word sequences is assigned by human annotators.

5. The method of claim 1, wherein the CRF definition extraction model is generated by a CRF training component, the CRF training component using the dense vector representations and the binary labels assigned by the CNN definition identification model to train the CRF definition extraction model to automatically detect the boundaries of the terminology definition with the word sequence.

6. The method of claim 1, wherein the CRF definition extraction model is configured to tag words in the word sequence that are part of the terminology definition in the word sequence.

7. A system for automatically generating a terminology definition knowledge base (KB) from text media, the system comprising:
   a definition extraction component configured to process word sequences using dense vector representations, a CNN definition identification model and a CRF definition extraction model to extract terminology definitions found in the word sequences and to add the extracted terminology definitions to the terminology definition KB,
   wherein the dense vector representations are used to map the words in the word sequences to real value vectors,
   wherein the CNN definition identification model processes the word sequences based on the dense vector representations to identify whether a respective word sequence includes a terminology definition and to label the word sequence with a binary label indicating whether a terminology definition exists within the word sequence, and
   wherein the CRF definition extraction model processes the word sequences based on the dense vector representations of the words and the binary label assigned by the CNN definition identification model to identify boundaries of the terminology definition in the word sequence.

8. The system of claim 7, wherein the dense vector representations are generated by a word representation training component that receives a text collection as input and uses a skip-gram recursive neural network (RNN) to process the text collection to generate the dense vector representations.

9. The system of claim 7, wherein the CNN definition identification model is generated by a CNN training component, the CNN training component using the dense vector representation and a plurality of training word sequences to train the CNN definition identification model to automatically identify whether a word sequence includes a terminology definition and to assign an appropriate binary label to the word sequence.

10. The system of claim 9, wherein the binary label assigned to the respective training word sequences is assigned by human annotators.

11. The system of claim 7, wherein the CRF definition extraction model is generated by a CRF training component, the CRF training component using the dense vector representations and the binary labels assigned by the CNN definition identification model to train the CRF definition extraction model to automatically detect the boundaries of the terminology definition with the word sequence.

12. The system of claim 7, wherein the CRF definition extraction model is configured to tag words in the word sequence that are part of the terminology definition in the word sequence.

* * * * *